United States Patent
Kim

(10) Patent No.: US 8,786,656 B2
(45) Date of Patent: Jul. 22, 2014

(54) LENS ARRAY, LINEAR LIGHT EXPOSURE DEVICE, AND OPTICAL APPARATUS EMPLOYING THE LINEAR LIGHT EXPOSURE UNIT

(75) Inventor: Wan-chin Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/067,008

(22) Filed: May 2, 2011

(65) Prior Publication Data

US 2011/0280628 A1 Nov. 17, 2011

(30) Foreign Application Priority Data

May 11, 2010 (KR) .......................... 10-2010-0044055

(51) Int. Cl.
*B41J 15/14* (2006.01)
*B41J 27/00* (2006.01)

(52) U.S. Cl.
USPC .......................................... 347/241; 347/256

(58) Field of Classification Search
USPC .......................... 347/230, 241–244, 256–258
See application file for complete search history.

(56) References Cited

U.S. PATENT DOCUMENTS

| | | | |
|---|---|---|---|
| 3,544,190 A | 12/1970 | Moorhusen et al. | |
| 3,580,675 A | 5/1971 | Hieber et al. | |
| 4,215,933 A | 8/1980 | Feneberg et al. | |
| 4,734,734 A * | 3/1988 | Yano ............................. | 399/186 |
| 5,023,442 A * | 6/1991 | Taniguchi et al. .......... | 250/208.1 |
| 5,444,520 A * | 8/1995 | Murano ........................ | 399/221 |
| 5,617,131 A * | 4/1997 | Murano et al. ............... | 347/233 |
| 5,796,522 A * | 8/1998 | Meyers ......................... | 359/626 |
| 6,330,017 B1 * | 12/2001 | Suzuki .......................... | 347/238 |
| 7,760,215 B2 * | 7/2010 | Inoue et al. .................. | 347/130 |
| 7,764,429 B2 * | 7/2010 | Nomura ........................ | 359/621 |
| 7,957,067 B2 * | 6/2011 | Yamamura .................... | 359/622 |
| 2007/0091197 A1 | 4/2007 | Okayama et al. | |

FOREIGN PATENT DOCUMENTS

| | | | |
|---|---|---|---|
| DE | 3146026 | 6/1982 | |
| EP | 0 002 736 | 7/1979 | |
| JP | 63085768 A * | 4/1988 | ............ G03G 15/04 |
| JP | 2006-19918 | 1/2006 | |
| KR | 10-2008-0080046 | 9/2008 | |

OTHER PUBLICATIONS

Patent Abstracts of Japan, Publication No. 2006-019918, Published Jan. 19, 2006.
European Search Report in Application No. 11165228.5 dated Jul. 6, 2011.
Espacenet English Abstract of Korean Application No. 20080080046 published Sep. 2, 2008.
European Patent Office Action dated Jul. 12, 2013 in Appln. No. 11 165 228.5.

* cited by examiner

*Primary Examiner* — Hai C Pham
(74) *Attorney, Agent, or Firm* — Staas & Halsey LLP

(57) ABSTRACT

A lens array, a linear light exposure device, and an optical apparatus including the linear light exposure device. The lens array includes: an image side lens array unit in which a plurality of lens cells are arranged in at least one line along an arrangement direction to have optical axes parallel with each other; and a light blocking unit provided on an incidence surface of the image side lens array unit, the light blocking unit having light transmission regions, through which light is transmitted toward each lens cell, and blocking regions in regions other than the light transmission regions, wherein each lens cell of the image side lens array unit has a square formed effective optical region.

23 Claims, 15 Drawing Sheets

LENS ARRAY, LINEAR LIGHT EXPOSURE DEVICE, AND OPTICAL APPARATUS EMPLOYING THE LINEAR LIGHT EXPOSURE UNIT

CROSS-REFERENCE TO RELATED APPLICATIONS

This application claims the benefit of Korean Patent Application No. 10-2010-0044055, filed on May 11, 2010, in the Korean Intellectual Property Office, the disclosure of which is incorporated herein in its entirety by reference.

BACKGROUND

1. Field

The present invention relates to a lens array, a linear light exposure device, and an optical apparatus including the linear light exposure device.

2. Description of the Related Art

A linear light exposure device including a lens array is used in an image forming apparatus such as a printer, a photocopier, or a multi-functional printer, or an information reader such as a barcode reader or a scanner. For example, a linear light exposure device is used to linearly form an image on a photoconductive drum in an image forming apparatus.

An example of the lens array used in a general linear light exposure device may include a rod lens array in which cylindrical rod lenses are arranged in at least one line. Such a rod lens is an optical device having a refractive power that may be obtained by changing a glass fiber component in a diameter direction. Another example of the lens array may include a lens array including an upper lens array and a lower lens array, wherein, in the upper lens array, circular lenses are arranged in at least one line and in the lower lens array, pairs of lenses are formed sharing the same optical axes.

SUMMARY

The present invention provides a lens array in which fluctuations in quantity of light exposed to a surface are reduced by controlling a lens arrangement period, a linear light exposure device, and an optical apparatus including the linear light exposure device.

According to an aspect of the present invention, there is provided a lens array including: an image side lens array unit in which a plurality of lens cells are arranged in one line or a plurality of lines along an arrangement direction and arranged having optical axes thereof parallel with each other; and a light blocking unit provided on an incidence surface of the image side lens array unit, the light blocking unit having light transmission regions, through which light is transmitted toward each lens cell of the image side lens array unit, and blocking regions in regions other than the light transmission regions, wherein each lens cell of the image side lens array unit has a square formed effective optical region.

The lens array may further include a light source side lens array unit spaced apart from the image side lens array unit by the light blocking unit.

The light source side lens array unit may include a plurality of lens cells having the same optical axes as the plurality of lens cells of the image side lens array unit, the plurality of lens cells of the light source side lens array unit each having a square formed effective optical region.

Each lens cell of the image side lens array unit and the light source side lens array unit may have a square form.

When $D_X$ is a length of the effective optical regions of the lens cells of the image side lens array unit and the light source side lens array unit in the arrangement direction and P is a distance between centers of the lens cells in a single line, the lens cells of the image side lens array unit and the light source side lens array unit may satisfy $D_X \leq P$.

The lens cells of the image side lens array unit and the light source side lens array unit may further satisfy $P \leq 2D_X$.

Cross sections of the light transmission regions of the light blocking unit that are perpendicular to the optical axes of the lens cells may be square formed.

When $D_X$ is a length of the effective optical regions of the lens cells of the image side lens array unit and the light source side lens array unit in the arrangement direction, $D_Y$ is a length of the effective optical regions of the lens cells in a direction perpendicular to the arrangement direction, $W_X$ is a length of the light transmission regions in the light blocking unit in the arrangement direction, and $W_Y$ is a length of the light transmission regions in a direction perpendicular to the arrangement direction, the light transmission regions may satisfy $W_X \leq D_X$ and $W_Y \leq D_Y$.

The light source side lens array unit and the image side lens array unit may constitute a unit magnification (1×) image forming optical system.

Each lens cell of the light source side lens array unit may have an emitting surface having the same curvature as an incidence surface of each lens cell of the image side lens array unit, and each lens cell of the source side lens array unit may have an incidence surface having the same curvature as an emitting surface of each lens cell of the image side lens array unit.

At least one of incidence surfaces and emitting surfaces of each lens cell of the image side lens array unit and the light source side lens array unit may be an aspheric surface.

According to another aspect of the present invention, there is provided a linear light exposure device including: a light source module in which light emitting elements are arranged in one line or a plurality of lines; and the lens array described above for irradiating light emitted from the light source module to a surface to be exposed.

According to another aspect of the present invention, there is provided an optical apparatus for forming an image including: the linear light exposure device described above; photoconductive medium on which an electrostatic latent image is formed by light irradiated from the linear light exposure device; a developing unit for developing the electrostatic latent image formed on the photoconductive medium; a transferring unit for transferring the image developed by the developing unit to a printing medium; and a fixing unit for fixing the image transferred to the printing medium.

According to another aspect of the present invention, there is provided an optical apparatus for irradiating light to an information medium to which information is recorded and reading information of the information medium from light reflected from the information medium, the apparatus including: the linear light exposure device; and an optical detection unit for detecting light reflected from the information medium.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
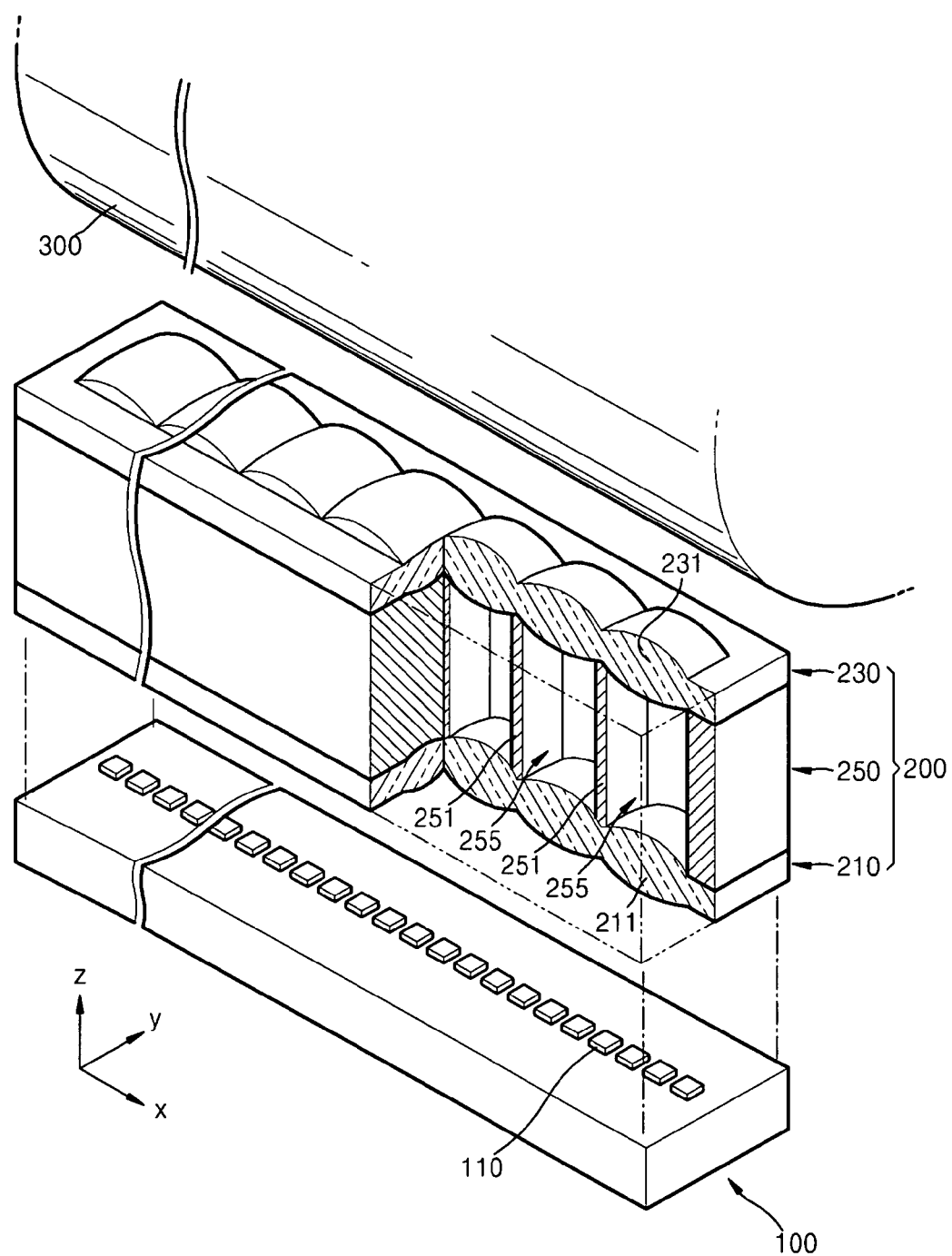
FIG. 1 is a partially cut perspective view of a lens array and a linear light exposure device according to an embodiment of the present invention.

Hereinafter, exemplary embodiments of the present invention will be described more fully with reference to the accompanying drawings. The present invention should not be construed as being limited to the embodiments set forth herein; rather, these embodiments are provided so that this disclosure will be thorough and complete, and will fully convey the concept of the invention to those skilled in the art. In the drawings, like reference numerals denote like elements and the sizes of elements are exaggerated for clarity.

Figure 2:
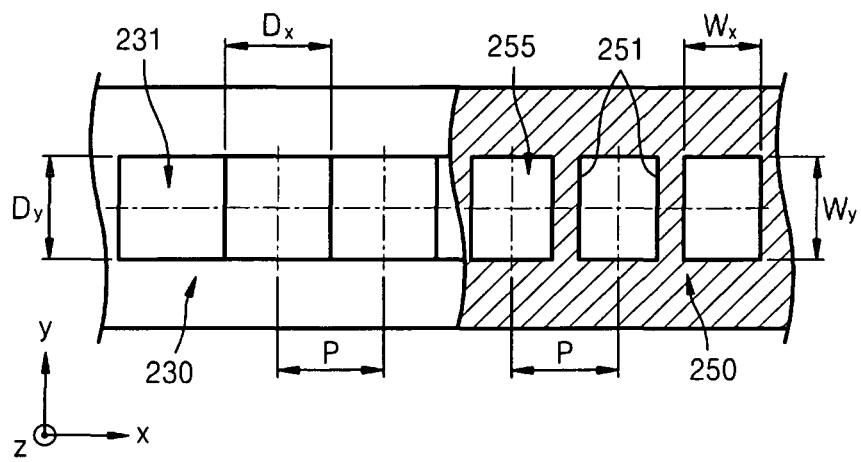
FIG. 2 is a cross-sectional view of the lens array of FIG. 1 viewing from the top.
Figure 3:
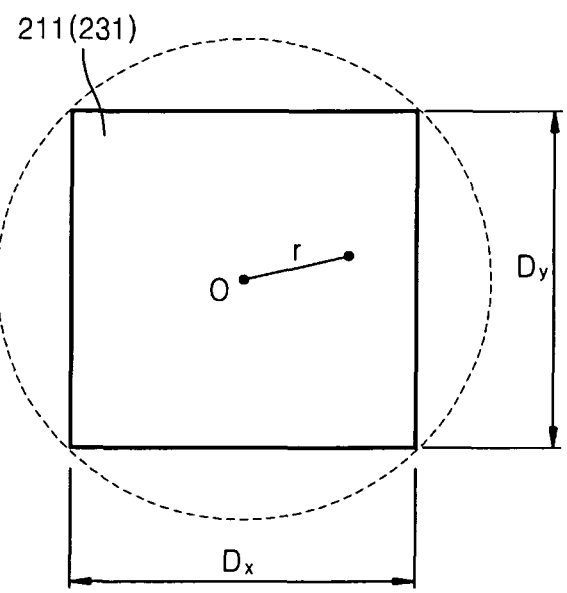
FIG. 3 is a plan view of a lens cell of the lens array of FIG. 1.
Figure 4:
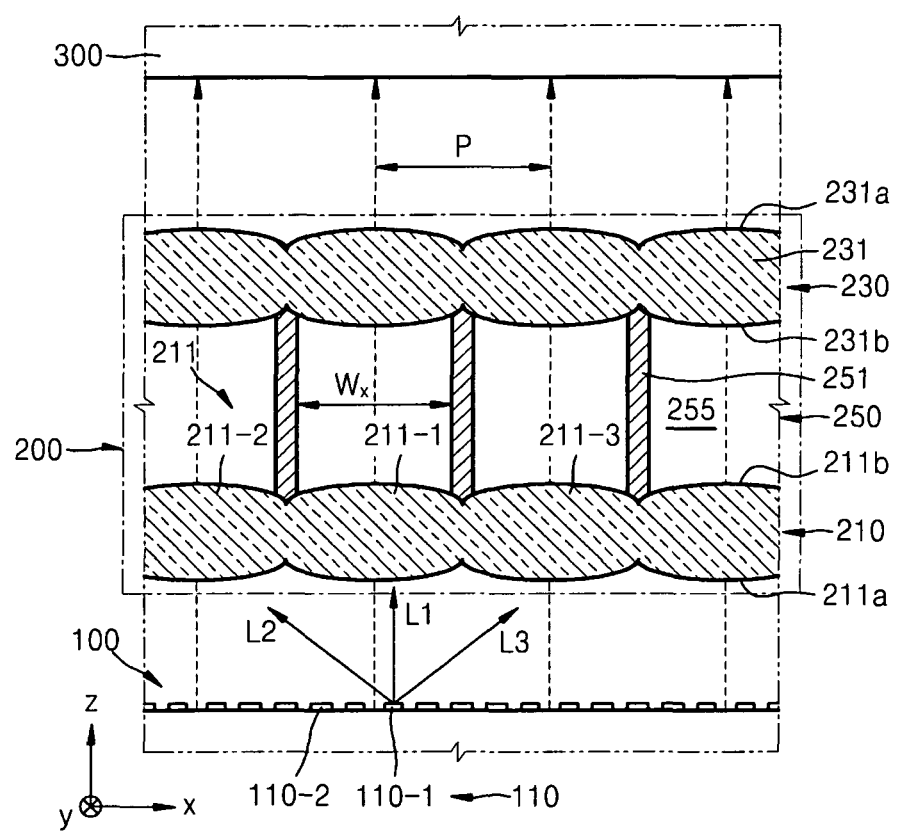
FIG. 4 is a vertical-sectional view of the lens array of FIG. 1.
Figure 5:
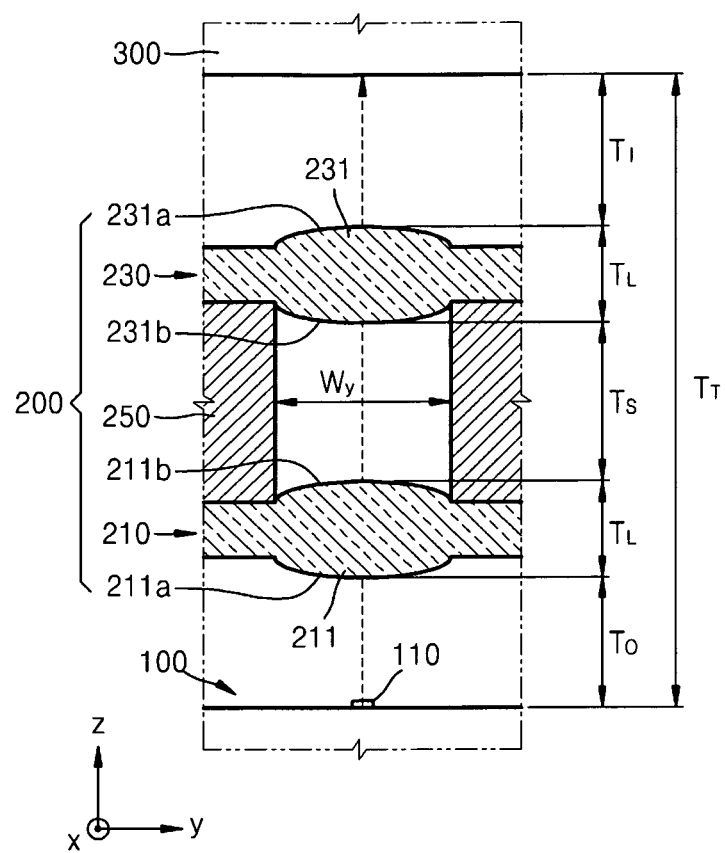
FIG. 5 is a transverse-sectional view of the lens array of FIG. 1.

FIG. 1 is a partially cut perspective view of a lens array 200 and a linear light exposure device according to an embodiment of the present invention, FIG. 2 is a cross-sectional view of the lens array 200 of FIG. 1 as viewed from above, FIG. 3 is a plan view of one lens cell 211 or 231 of the lens array 200 of FIG. 1, FIG. 4 is a vertical-sectional view of the lens array 200 of FIG. 1, and FIG. 5 is a transverse-sectional view of the lens array 200 of FIG. 1.

Referring to FIGS. 1 through 5, the linear light exposure device according to the current embodiment of the present invention includes a light source module 100 and the lens array 200.

The light source module 100 emits linear light and a plurality of light emitting elements 110 may be arranged in one line in the light source module 100. The light emitting elements 110 may be, for example, light emitting diodes (LEDs), laser diodes (LDs), or organic light emitting diodes. In some cases, the light emitting elements 110 may be arranged in a plurality of lines. The plurality of light emitting elements 110 may be driven at the same time or separately controlled and driven according to a function of the light source module 100. For example, when the linear light exposure device according to the current embodiment of the present invention is employed as a line printer head of an image forming apparatus, the light emitting elements 110 of the light source module 100 may separately emit light in order to form a linear image according to image information. Also, when the linear light exposure device according to the current embodiment of the present invention is employed as a scanner of an information reader, the light emitting elements 110 of the light source module 100 may be driven at the same time in order for simple linear light beams to be irradiated. A surface on which the light emitting elements 110 of the light source module 100 are disposed may be generally referred to as an object surface.

The lens array 200 according to the current embodiment of the present invention is an optical device that forms an image on a surface to be exposed 300 using light emitted from the light source module 100. The lens array 200 includes a pair of lens array units 210 and 230 and light blocking units 250 interposed between the pair of lens array units 210 and 230. The surface to be exposed 300 is an image surface on which an image may be formed by the lens array 200 using linear light beams emitted from the light source module 100.

The lens array unit 210 may be formed by integrally forming a plurality of the lens cells 211 with a transparent substrate as a single body or by attaching the lens cells 211 on a transparent substrate. The lens array unit 230 may be formed in the same manner as the forming of the lens array unit 210 but is formed with a plurality of the lens cells 231 instead of the lens cells 211. The pair of lens array units 210 and 230 may be formed of, for example, transparent plastic or a glass material. The lens array unit 210, which is adjacent to the light source module 100, is called a light source side lens array unit 210 and the lens array unit 230, which is adjacent to the surface to be exposed 300, is called an image side lens array unit 230.

The light source side lens array unit 210 includes the plurality of lens cells 211 in which optical axes thereof are arranged to be parallel with each other in one line and the image side lens array unit 230 includes the plurality of lens cells 231 in which optical axes thereof are arranged to be parallel with each other in one line. The lens cells 211 and 231 are arranged in substantially the same paths as those of light emitted from the light emitting elements 110 of the light source module 100. Here, an arrangement period P of the lens cells 211 and 231 may be the same as or greater than an arrangement period of the light emitting elements 110. That is, the lens cells 211 and 231 may be arranged in such a way that at least one light emitting element 110 may correspond to each of the lens cells 211 and 231. In FIG. 1, the light emitting elements 110 and the lens cells 211 and 231 are arranged in an X-axis direction.

In the light source side lens array unit 210 and the image side lens array unit 230, when viewed from an xy plane, the lens cells 211 and 231 have square forms, respectively, as illustrated in FIGS. 1 and 2. As the lens cells 211 and 231 have square forms, the lens cells 211 and 231 may be arranged closely to each other.

As illustrated in FIG. 3, curved surfaces of the lens cells 211 and 231 may be designed to be curved surfaces of a rectangle based on a vertex O of a curved surface in a rotationally symmetrical aspheric lens. Here, a rotationally symmetrical aspheric surface may be represented by a function z(r) represented by Formula 1 below.

$$z(r) = \frac{Cr^2}{1 + \sqrt{1 - C^2 r^2}} + A_1 r^4 + A_2 r^6 \qquad \text{Formula 1}$$

The function z(r) represents a height of a point spaced apart from the vertex O of the curved surfaces of the lens cells 211 and 231 by a distance r and indicates a rotationally symmetrical aspheric curved surface having the vertex O as an origin. In Formula 1, C is a curvature, and $A_1$ and $A_2$ are quaternary asphericity and senary asphericity, respectively. The curvature C and the asphericities $A_1$ and $A_2$ of each of the incidence surfaces 211a and 231b and emitting surfaces 211b and 213a of the lens cells 211 and 231 may have different values. In the current embodiment, the incidence surfaces 211a and 231b and emitting surfaces 211b and 213a of the lens cells 211 and 231 are aspheric surfaces. However, any one of the incidence surfaces 211a and 231b and the emitting surfaces 211b and 213a may be aspheric surfaces. Also, the incidence surfaces 211a and 231b and emitting surfaces 211b and 213a of the lens cells 211 and 231 may be formed as simple spherical surfaces.

As will be described later, light transmission regions 255 of the light blocking units 250 have square-form cross sections so as to correspond to the square-form curved surfaces of the lens cells 211 and 231 and thus it may be understood that the square-form regions of the lens cells 211 and 231 are effective optical regions. When the size of the cross-sections of the light transmission regions 255 of the light blocking units 250 is significantly smaller than the size of the curved surfaces of the lens cells 211 and 231, the effective optical regions of the lens cells 211 and 231 may be slightly smaller than the curved surfaces of the lens cells 211 and 231. Here, the effective optical regions of the lens cells 211 and 231 may be defined as optical regions onto which light may be incident.

Since the effective optical regions of the lens cells 211 and 231 have square forms, arrangement of the lens cells 211 and 231 is optimized and thus regions that are not used to form an image may be reduced. For example, when the effective optical regions of the lens cells 211 and 231 are substantially the same as the curved regions of the lens cells 211 and 231, as in the current embodiment, the effective optical regions of the lens cells 211 and 231 may be arranged in one line without gaps therebetween. In the current embodiment, the effective optical regions of the adjacent lens cells 211 and 231 are arranged to be adjacent to each other, however, the present invention is not limited thereto. For example, when the sizes of the lens cells 211 and 231 are smaller than the arrangement period P of the lens cells 211 and 231 or the effective optical regions of the lens cells 211 and 231 are smaller than the curved regions of the lens cells 211 and 231, the effective optical regions of the lens cells 211 and 231 may be arranged to have predetermined gaps therebetween. That is, the effective optical regions of the lens cells 211 and 231 may be represented by Formula 2.

$$D_X \leq P \qquad \text{Formula 2}$$

In Formula 2, $D_X$ denotes a length of the effective optical regions of the lens cells 211 and 231 in an arrangement direction (that is, the x-axis direction) and P denotes the arrangement period P of the lens cells 211 and 231, that is, a distance between centers of the lens cells 211 and 231. In FIG. 2, $D_Y$ denotes a width of the lens cells 211 and 231 in a direction perpendicular to the arrangement direction (that is, a y-axis direction).

In addition, the lens cells 211 and 231 may be represented by Formula 3 below.

$$P \leq 2 D_X \qquad \text{Formula 3}$$

Formula 3 restricts the arrangement period P of the lens cells 211 and 231. When gaps between the effective optical regions of the lens cells 211 and 231 increase, the quantity of linear light beams irradiated from the linear light exposure device may be non-uniform in a linear direction. Thus, the lens cells 211 and 231 may be arranged to satisfy Formula 3 to suppress non-uniformity of the quantity of linear light beams in the linear direction.

Each lens cell 211 of the light source side lens array unit 210 and each lens cell 231 of the image side lens array unit 230 may be spaced apart from each other by the light blocking units 250 and may correspond to each other and thus the lens cells 211 and 231 may be formed as pairs. Each lens cell 211 of the light source side lens array unit 210 and each lens cell 231 of the image side lens array unit 230 may have the same optical axes. In addition, in the light source side lens array unit 210 and the image side lens array unit 230, outer curved surfaces and inner curved surfaces of the lens cells 211 and 231 may have curvatures that are symmetrical to each other. That is, the incidence surface 211a of each lens cell 211 of the light source side lens array unit 210 may have the same curvature as the emitting surface 231a of each lens cell 231 of the image side lens array unit 230. Also, the emitting surface 211b of each lens cell 211 of the light source side lens array unit 210 may have the same curvature as the incidence surface 231b of each lens cell 231 of the image side lens array unit 230. Such a symmetrical pair lens structure of the light source side lens array unit 210 and image side lens array unit 230 may constitute a unit magnification (1×) image forming optical system. For example, the lens array 200 according to the current embodiment may erect an inverted image formed by the light source side lens array unit 210 by using the image side lens array unit 230 so that an erect image may be formed without unit magnification (1×). In some cases, a pair lens structure of the light source side lens array unit 210 and image side lens array unit 230 may be a general reduction or expansion image forming optical system.

The light blocking units 250 include the light transmission regions 255 arranged in one line in a one to one correspondence with the effective optical regions of the lens cells 211 and 231, and regions of the light blocking units 250 other than the light transmission regions 255 include partition walls 251. The partition walls 251 may be formed of a metal for blocking light, or by processing an absorber or anti reflection coating on a polymer having high absorption or on glass. The light transmission regions 255 may be formed having square-form cross sections perpendicular to the optical axis (a z-axis direction in FIG. 1) in order to correspond to the effective optical regions of the lens cells 211 and 231. The light transmission regions 255 may be empty or may be filled with a transparent material for transmitted light.

Here, the light transmission regions 255 of the light blocking units 250 may be formed to satisfy Formulae 4 and 5 below.

$$W_X \leq D_X \quad \text{Formula 4}$$

$$W_Y \leq D_Y \quad \text{Formula 5}$$

In Formulae 4 and 5, $W_X$ denotes a length of the light transmission regions 255 in an arrangement direction (that is, the x-axis direction) and $W_Y$ denotes a width of the light transmission regions 255 in a direction perpendicular to the arrangement direction (that is, the y-axis direction). Formulae 4 and 5 denote that each of the light transmission regions 255 of the light blocking units 250 has dimensions the same as those of the effective optical regions of the lens cells 211 and 231 or has dimensions within those of the effective optical regions of the lens cells 211 and 231.

The light emitting elements 110 may emit light. Accordingly, when the light blocking units 250 are not provided, a part of emitted light may form a ghost image on the surface to be exposed 300. Referring to FIG. 4, light L1 incident on a corresponding lens cell 211-1 from among lights L1, L2, and L3 emitted from light emitting elements 110-1 and 110-2 facing any one lens cell 211-1 from among the lens cells 211 of the light source side lens array unit 210 is used to correctly form an image on the surface to be exposed 300, whereas the lights L2 and L3 incident on adjacent lens cells 211-2 and 211-3 may not correctly form an image on the surface to be exposed 300. Accordingly, when the light blocking units 250 are not provided, the lights L2 and L3 incident on the adjacent lens cells 211-2 and 211-3 may form a ghost image on the surface to be exposed 300. However, in the current embodiment, the light transmission regions 255 of the light blocking units 250 are formed in a one to one correspondence with the lens cells 211 of the light source side lens array unit 210 so that the lights L2 and L3 incident on the adjacent lens cells 211-2 and 211-3 may be blocked by the partition walls 251. Accordingly, the linear light exposure device according to the current embodiment of the present invention may suppress formation of a ghost image.

Next, the lens array 200 according to the current embodiment of the present invention will be described more fully with reference to Example 1 according to an embodiment of the present invention and Comparative Example 1.

Table 1 below illustrates optical designing figures of Example 1 and a Comparative Example 1.

The lens array 200 according to Example 1 is designed as illustrated in Table 1. Compare also FIG. 5. In Table 1, $T_O$ denotes an object distance, that is, a distance between an emission surface (that is, an object surface) on which the light emitting element 110 is disposed and a convex of an outer curved surface of the light source side lens array unit 210, $T_I$ denotes an image distance, that is, a distance between an outer curved surface of the image side lens array unit 230 and a surface to be exposed 300 (that is, the image surface), $T_L$ denotes a thickness of the lens cells 211 and 231 of the light source side lens array unit 210 and image side lens array unit 230, respectively, $T_S$ denotes a thickness of the light blocking units 250 interposed between the light source side lens array unit 210 and the image side lens array unit 230, and $T_T$ denotes a total optical distance from the emission surface to the image surface.

TABLE 1

| Mark | Name | Example 1 | Comparative Example 1 |
|---|---|---|---|
| P | Arrangement period of lens cells [mm] | 1.0 | 1.4 |
| $D_X$ | Length in arrangement direction of lens cells [mm] | 1.0 | 1.4 |
| $D_Y$ | Width in direction perpendicular to arrangement direction of lens cells [mm] | 1.0 | 1.4 |
| $W_X$ | Length in arrangement direction of light transmission regions [mm] | 0.8 | 1.2 |
| $W_Y$ | Width in direction perpendicular to arrangement direction of light transmission regions [mm] | 0.8 | 1.2 |
| $T_O$ | Object distance [mm] | 4.6 | 4.6 |
| $T_L$ | Thickness of lens cells [mm] | 2.0 | 2.0 |
| $T_S$ | Thickness of light blocking units [mm] | 2.48 | 2.48 |
| $T_I$ | Image distance [mm] | 4.6 | 4.6 |
| $T_T$ | Total optical distance [mm] | 15.68 | 15.68 |
| $C_O$ | Curvature of outer curved surface of lens cell [1/mm] | 0.9426 | 0.9426 |
| $A_{1O}$ | Quaternary asphericity of outer curved surface of lens cell | −0.1170 | −0.1170 |
| $A_{2O}$ | Senary asphericity of outer curved surface of lens cell | −0.0424 | −0.0424 |
| $C_I$ | Curvature of inner curved surface of lens cell [1/mm] | −0.7129 | −0.7129 |
| $A_{1I}$ | Quaternary asphericity of inner curved surface of lens cell | 0.2871 | 0.2871 |
| $A_{2I}$ | Senary asphericity of inner curved surface of lens cell | 0.0138 | 0.0138 |

Figure 6:
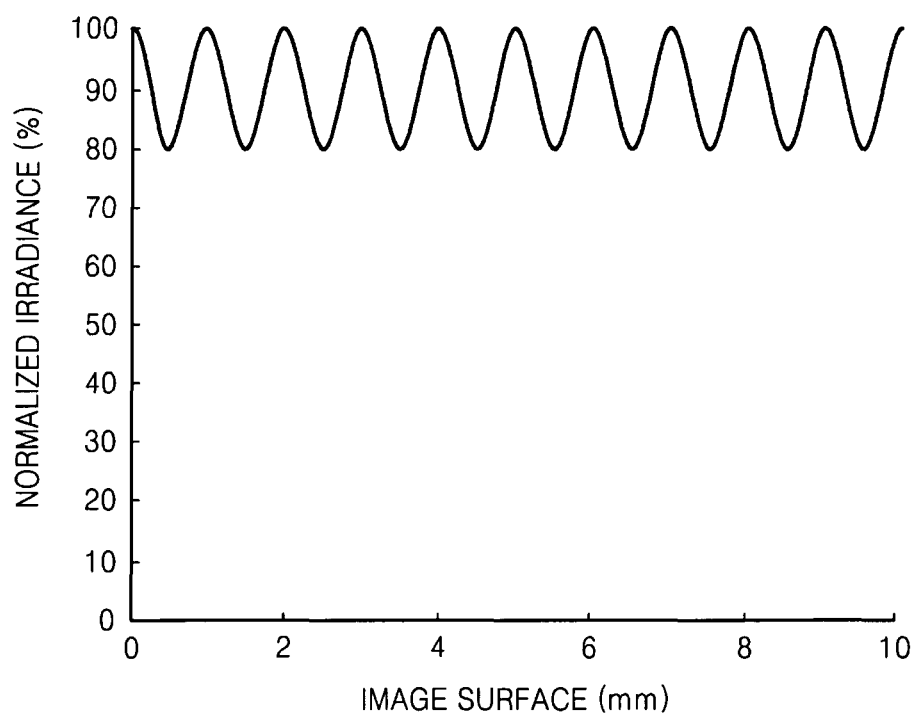
FIG. 6 is a graph showing fluctuations in normalized irradiance of light irradiated by the linear light exposure device of FIG. 1 onto an image surface.

FIG. 6 is a graph showing a normalized irradiance curve of light irradiated onto an image surface by the linear light exposure device of FIG. 1 including the lens array of Example 1 designed according to Table 1. In FIG. 6, a horizontal axis indicates a location of the image surface along the arrangement direction of the plurality of light emitting elements 110 (that is, the x-axis direction) and the illustrated normalized irradiance curve may be an envelope curve formed of separate normalized irradiance curves emitted from the plurality of light emitting elements 110.

Figure 7:
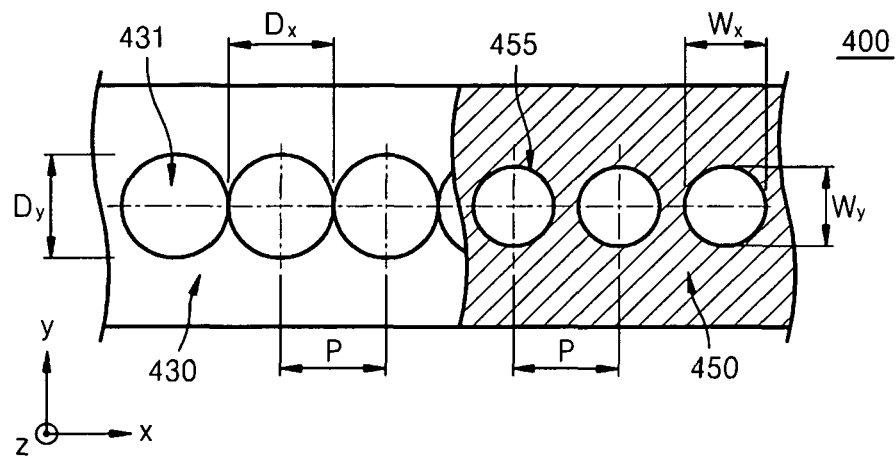
FIG. 7 is a cross-sectional view partially illustrating a lens array of Comparative Example 1 as viewed from above.

FIG. 7 is a cross-sectional view partially illustrating a lens array 400 of Comparative Example 1 as viewed from above, wherein the lens array 400 of Comparative Example 1 is designed according to Table 1. Referring to FIG. 7, the lens array 400 according to Comparative Example 1 includes a light source side lens array (not illustrated), an image side lens array 430 including circular lens cells 431, and a light blocking unit 450 including circular light transmission regions 455. The light source side lens array (not illustrated) forms a pair with the image side lens array 430 and is symmetrical with respect to the image side lens array 430 and is provided at an incidence side of the light blocking unit 450. The lens cells 431 have circular effective optical regions, and Dx as a length of the lens cells 431 in an arrangement direction and $D_Y$ as a width of the lens cells 431 in a direction perpendicular to the arrangement direction are equal to a diameter of the circles. Also, an arrangement period P of the lens cells 431 is the same as an aperture of the lens cells 431 (that is, $D_X$ and $D_Y$). In the light transmission regions 455 of the light blocking unit 450, $W_X$ as a length of the light transmission regions 455 in an arrangement direction and $W_Y$ as a width of light transmission regions 455 in a direction perpendicular to the arrangement direction are equal to a diameter of the circles. The lens array 400 according to Comparative Example 1 is different from the lens array 200 according to the current embodiment of the present invention in that the lens cells 431 and the light transmission regions 455 have circular forms and each lens cell 431 has a circular effective optical region.

In Example 1 and Comparative Example 1, a medium of the light source side lens arrays units 210 and the image side lens array units 230 and 430 is an optical resin Zeonex E48R which is a cyclo olefin based resin and may be integrally formed with a lens plate as a single body using resin molding. Also, the light blocking units 250 and 450 may be formed by processing an absorber or antireflection coating on a polymer having high absorption or on glass. A light source module (not illustrated) and a surface to be exposed (not illustrated) are arranged to be substantially the same as those of Example 1 of the current embodiment of the present invention.

Figure 8:
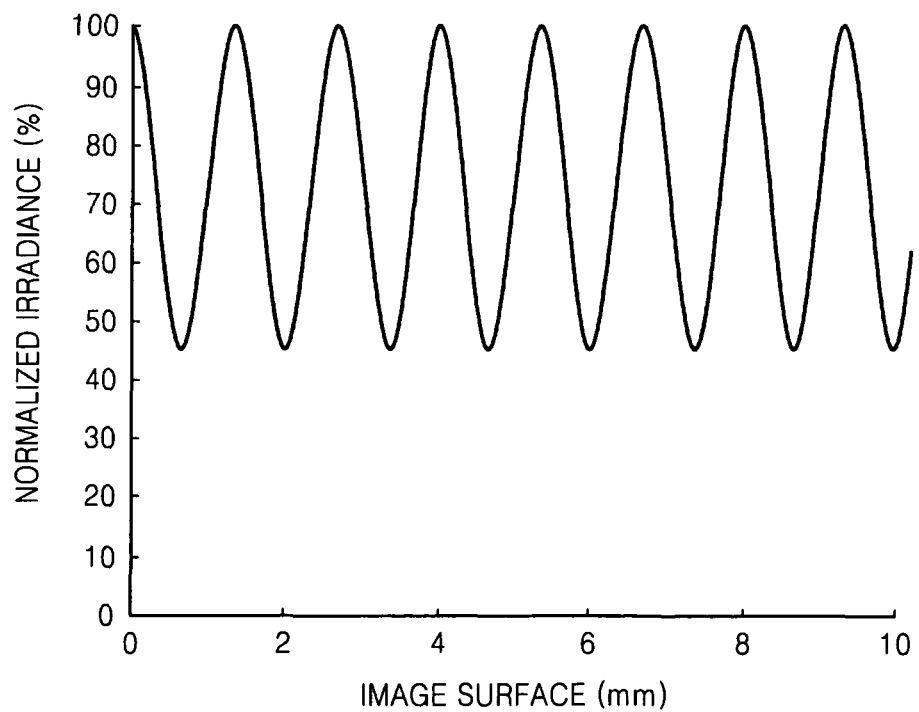
FIG. 8 is a graph showing fluctuations in normalized irradiance of light irradiated by a linear light exposure device including the lens array of FIG. 7 at an image surface.

FIG. 8 is a graph showing a normalized irradiance curve of light irradiated by the linear light exposure device including the lens array 400 of Comparative Example 1 designed according to Table 1 instead of the lens array 200 in the linear light exposure device of FIG. 1. The normalized irradiance curves illustrated in FIGS. 6 and 8 are periodically fluctuated according to the arrangement period of the lens cells 211, 231, and 431. The normalized irradiance curves are fluctuated because a quantity of light efficiently used to form an image from among light emitted from the light emitting elements 110 in the arrangement direction repeatedly increases and decreases. For example, in FIG. 4, most light emitted from the light emitting element 110-1 adjacent to the center part of any one lens cell 211-1 is incident on the corresponding lens cell 211-1; however, most light emitted from the light emitting element 110-2, that is, out of the center part of the lens cell 211-1, may not be incident on the corresponding lens cell 211-1. That is, the quantity of light incident on the lens cell 211-1 repeatedly increases and decreases along the arrangement direction of the light emitting elements 110 and thus the normalized irradiance is fluctuated along the arrangement direction of the light emitting elements 110. Such fluctuations in the normalized irradiance cause light intensity of the linear light exposure device to be non-uniform and reduce resolution.

Comparing FIG. 6 with FIG. 8, the fluctuation range of normalized irradiance of light at an image surface (that is, a surface to be exposed) of Example 1 is very small compared with the fluctuation range of normalized irradiance of light at an image surface of Comparative Example 1. That is, in Comparative Example 1 as illustrated in FIG. 8, a light quantity deviation is 55% within a period of 1.4 mm, which is the arrangement period P of the lens cells 431, at the image surface. On the other hand, in Example 1 as illustrated in FIG. 6, a light quantity deviation is no greater than 20% and a period in which occur light quantity fluctuations is reduced to 1.0 mm, which is the arrangement period P of the lens cells 211 and 231. As such, when a light quantity deviation of the linear light exposure device is no greater than 30%, quantity of light of the light emitting elements 110 may be controlled and thus the quantity of light used to form an image at the image surface may easily be uniform.

As described above, the fluctuation range of the normalized irradiance in Example 1 is smaller than the fluctuation range of the fluctuation range of in Comparative Example 1 because the effective optical regions of the lens cells 211 and 231 are formed to have square forms in Example 1 and thus deviations of magnitude of light quantity effectively used to form an image from light incident on the lens array 200 in the light source module 100 are suppressed. That is, in Example 1, as the gap between the lens cells 211 and 231 is reduced, a part of light that is not used to form an image from among light emitted from the light source module 100 may be blocked.

Also, the width $W_Y$ of the lens cells 211 and 231 in Example 1 is smaller than the width $W_Y$ of the lens cells 431 in Comparative Example 1 since the lens cells 211 and 231 of Example 1 take square forms as opposed to the circular form lens cells 431 of Comparative Example 1, while the cross-sectional areas of the lens cells 211 and 231 of Example 1 are substantially equal to the cross-sectional areas of the lens cells 431 of Comparative Example 1. Since the lens cells 211 and 231 in Example 1 are in square forms, outer regions of the lens cells 211 and 231 reduce aberrations. Since an aberration of a formed image is reduced in Example 1 compared with Comparative Example 1, a clearer and more uniform image may be formed.

Accordingly, resolution and fluctuations of quantity of light, which may result from a linear light exposure device including a general rod lens array or the lens array 400 of Comparative Example 1, may be significantly improved in the linear light exposure device by using the current embodiment.

Figure 9:
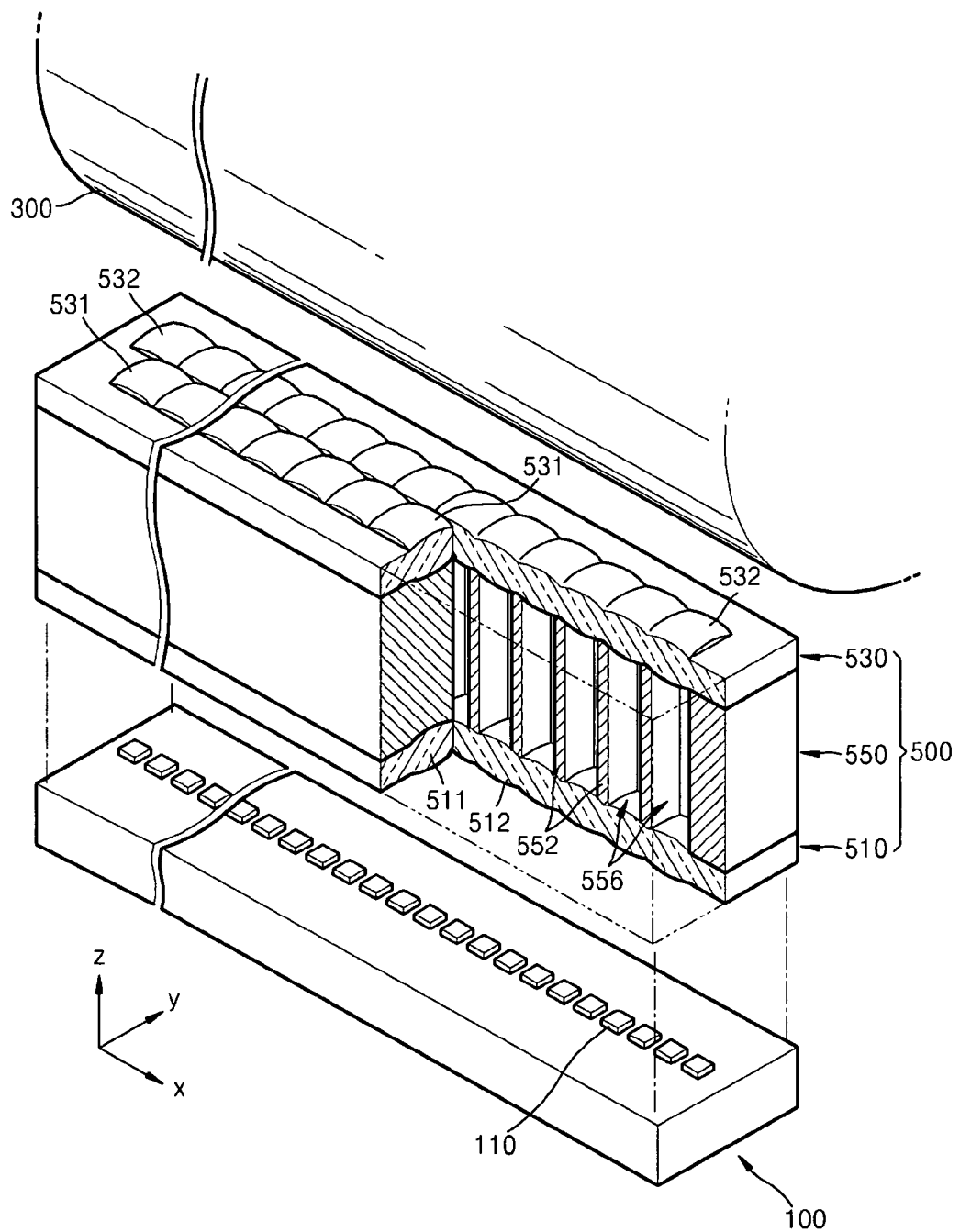
FIG. 9 is a partially cut perspective view of a lens array and a linear light exposure device according to another embodiment of the present invention.
Figure 10:
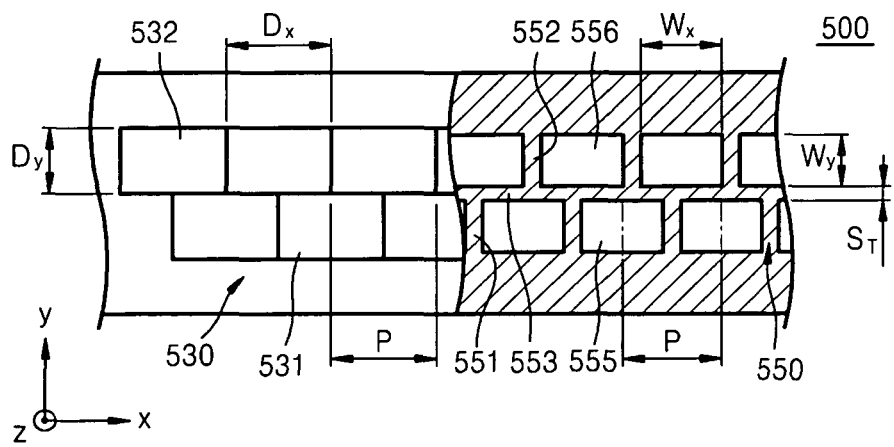
FIG. 10 is a cross-sectional view of the lens array of FIG. 9 as viewed from above.
Figure 11:
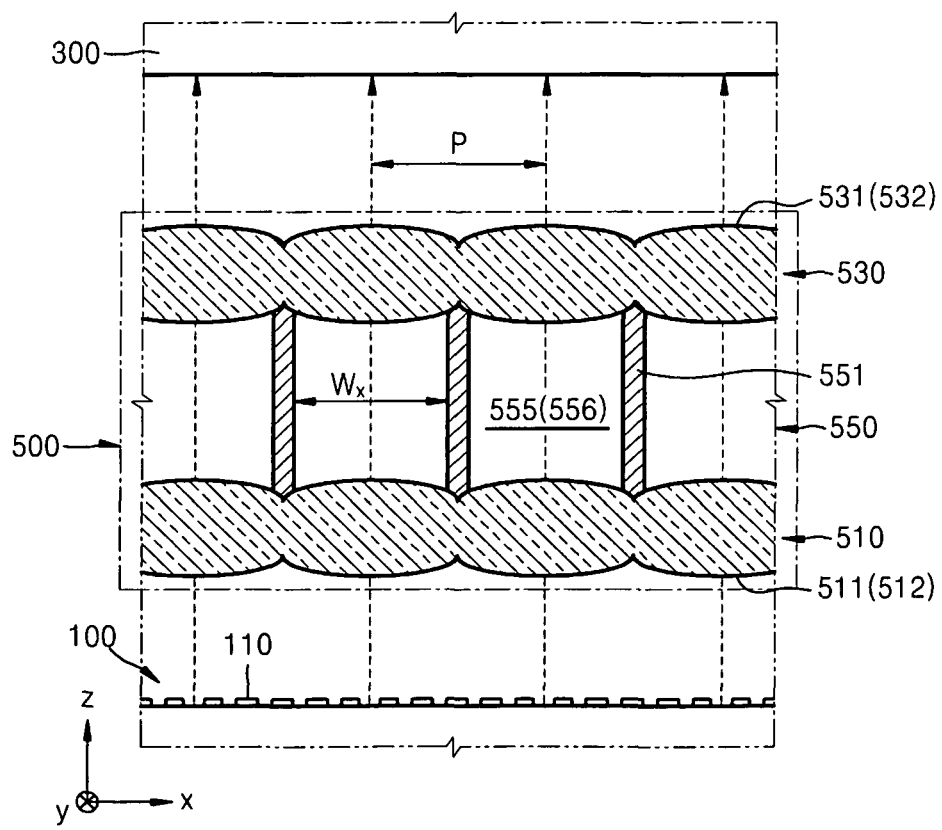
FIG. 11 is a vertical-sectional view of the lens array of FIG. 9.
Figure 12:
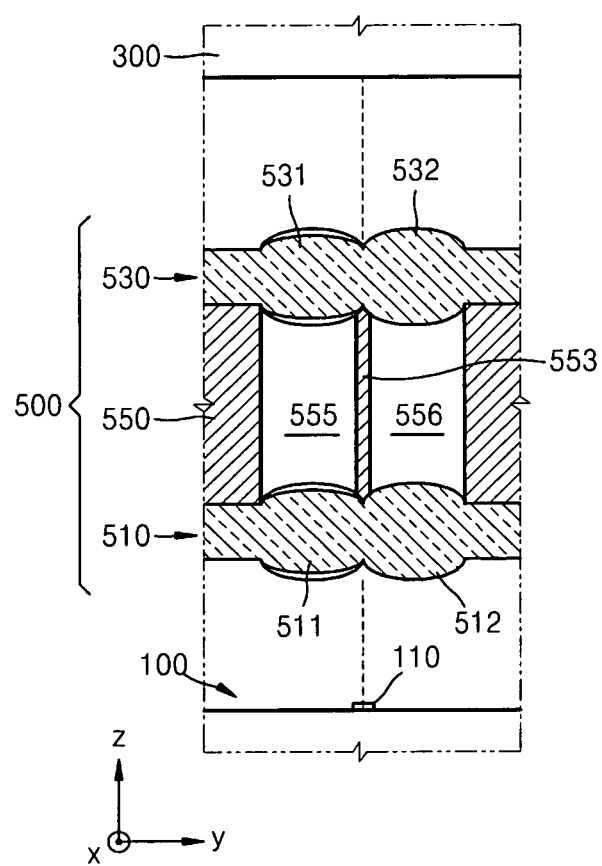
FIG. 12 is a transverse-sectional view of the lens array of FIG. 9.

FIG. 9 is a partially cut perspective view of a lens array 500 and a linear light exposure device according to another embodiment of the present invention, FIG. 10 is a cross-sectional view of the lens array 500 of FIG. 9 as viewed from above, FIG. 11 is a vertical-sectional view of the lens array 500 of FIG. 9, and FIG. 12 is a transverse-sectional view of the lens array 500 of FIG. 9.

Referring to FIGS. 10 through 12, the linear light exposure device according to the current embodiment of the present invention includes the light source module 100 and the lens array 500.

The lens array 500 includes a light source side lens array unit 510, light blocking units 550, and an image side lens array unit 530. In the current embodiment, forms of lens cells 511, 512, 531, and 532 of the lens array 500 may be the same as those described in the previous embodiment. That is, the lens cells 511, 512, 531, and 532 have square forms and effective optical regions of the lens cells 511, 512, 531, and 532 have square forms. The lens array 500 according to the current embodiment is different from the lens array 200 of FIG. 1 according to the previous embodiment in that the lens cells 511, 512, 531, and 532 are arranged in two lines and thereby, light transmission regions 555 and 556 of the light blocking units 550 are arranged in two lines. That is, the light source side lens array unit 510 has a two-line arrangement structure including a first line of the lens cells 511 and a second line of the lens cells 512 and the image side lens array unit 530 has a two-line arrangement structure including a first line of the lens cells 531 and a second line of the lens cells 532. Also, each of the lines of the lens cells 511, 512, 531, and 532 may satisfy Formulae 2 and 3 above.

In the light blocking units 550, the light transmission regions 555 in the first line correspond to the lens cells 511 and 531 in the first line and the light transmission regions 556 in the second line correspond to the lens cells 512 and 532 in the second line. The light transmission regions 555 in the first line are partitioned by first partition walls 551 and the light transmission regions 556 in the second line are partitioned by second partition walls 552. Also, the light transmission regions 555 in the first line and the light transmission regions 556 in the second line are partitioned by a third partition wall 553. The light transmission regions 555 and 556 of the light blocking units 550 may be formed to satisfy Formulae 4 and 5 above.

As illustrated in FIGS. 9 and 10, the lens cells 511 and 531 in the first line and the lens cells 512 and 532 in the second line are alternately arranged and the light transmission regions 555 in the first line and the light transmission regions 556 in the second line are also alternately arranged.

The light emitting elements 110 of the light source module 100 may be arranged in one line or in a plurality of lines. The light emitting elements 110 may correspond to gaps between the lens cells 511 and 531 in the first line and the lens cells 512 and 532 in the second line.

As the lens cells 511 and 531 in the first line and the lens cells 512 and 532 in the second line are alternately arranged, the light emitting elements 110 located adjacent to boundaries of the lens cells 511 and 531 in the first line are located adjacent to the center of each lens cell 512 and 532 in the second line. On the other hand, the light emitting elements 110 located adjacent to the boundaries of the lens cells 512 and 532 in the second line are located adjacent to the center of each lens cell 511 and 531 in the first line. Accordingly, a quantity of light effectively incident on the lens cells 511 and 512 of the light source side lens array unit 510 is periodically fluctuated along the arrangement direction of the light emitting elements 110. However, the fluctuated period is reduced by ½ and the fluctuation range thereof decreases compared with the fluctuated period of the linear light exposure device described with reference to FIGS. 1 through 5.

Next, the linear light exposure device according to the current embodiment of the present invention will be described more fully with reference to Example 2 according to an embodiment of the present invention and Comparative Example 2.

Table 2 below illustrates optical designing figures of Example 2 and Comparative Example 2.

Figure 13:
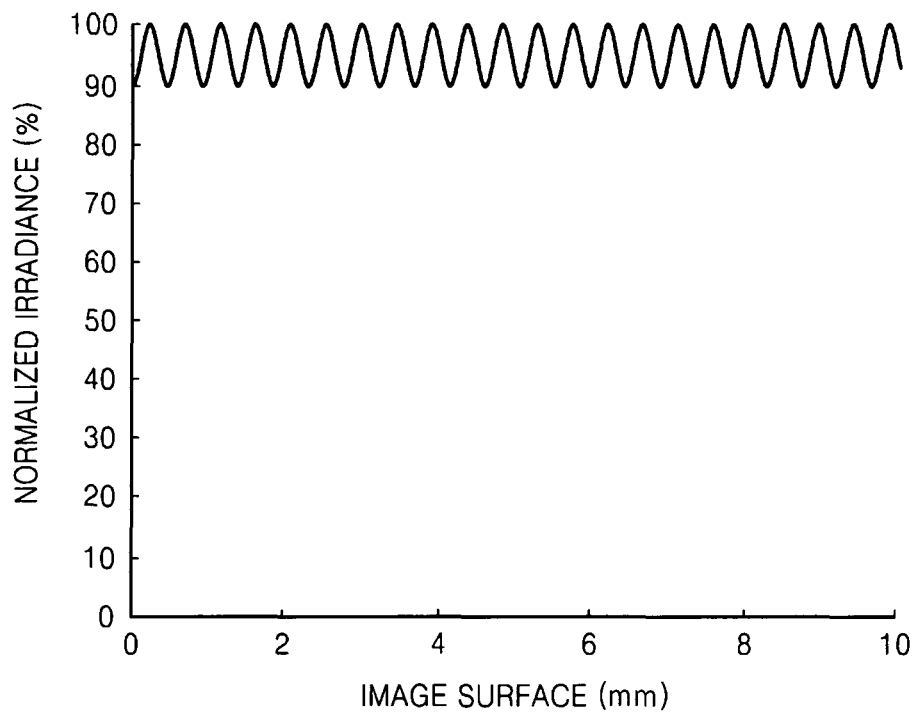
FIG. 13 is a graph showing fluctuations in normalized irradiance of light irradiated by the linear light exposure device including the lens array of FIG. 9 at an image surface.

The lens array 500 according to Example 2 is designed as illustrated in Table 2. The arrangement periods P of the lens cells 511, 512, 531, and 532 are each defined with respect to a single line and $S_T$ denotes a width between the light transmission regions 555 in the first line and the light transmission regions 556 in the second line, that is, a thickness of the third partition wall 553 of the light blocking units 550. Other reference marks are defined as in Table 1 or set out in Table 2. FIG. 13 is a graph showing a normalized irradiance curve of light irradiated by the linear light exposure device of FIG. 9 including the lens array 500 of Example 2 designed according to Table 2.

TABLE 2

| Mark | Name | Example 2 | Comparative Example 2 |
|---|---|---|---|
| P | Arrangement period of lens cells [mm] | 1.0 | 1.4 |
| $D_X$ | Length in arrangement direction of lens cells [mm] | 1.0 | 1.4 |
| $D_Y$ | Width in direction perpendicular to arrangement direction of lens cells [mm] | 0.7 | 0.9 |
| $W_X$ | Length in arrangement direction of light transmission regions [mm] | 0.8 | 1.2 |
| $W_Y$ | Width in direction perpendicular to arrangement direction of light transmission regions [mm] | 0.4 | 0.6 |
| $S_T$ | Thickness between lines of light transmission regions [mm] | 0.4 | 0.4 |
| $T_O$ | Object distance [mm] | 4.6 | 4.6 |
| $T_L$ | Thickness of lens cells [mm] | 2.0 | 2.0 |
| $T_S$ | Thickness of light blocking units [mm] | 2.48 | 2.48 |
| $T_I$ | Image distance [mm] | 4.6 | 4.6 |
| $T_T$ | Total optical distance [mm] | 15.68 | 15.68 |
| $C_O$ | Curvature of outer curved surface of lens cell [1/mm] | 0.9426 | 0.9426 |
| $A_{1O}$ | Quaternary asphericity of outer curved surface of lens cell | −0.1170 | −0.1170 |
| $A_{2O}$ | Senary asphericity of outer curved surface of lens cell | −0.0424 | −0.0424 |
| $C_I$ | Curvature of inner curved surface of lens cell [1/mm] | −0.7129 | −0.7129 |
| $A_{1I}$ | Quaternary asphericity of inner curved surface of lens cell | 0.2871 | 0.2871 |
| $A_{2I}$ | Senary asphericity of inner curved surface of lens cell | 0.0138 | 0.0138 |

Figure 14:
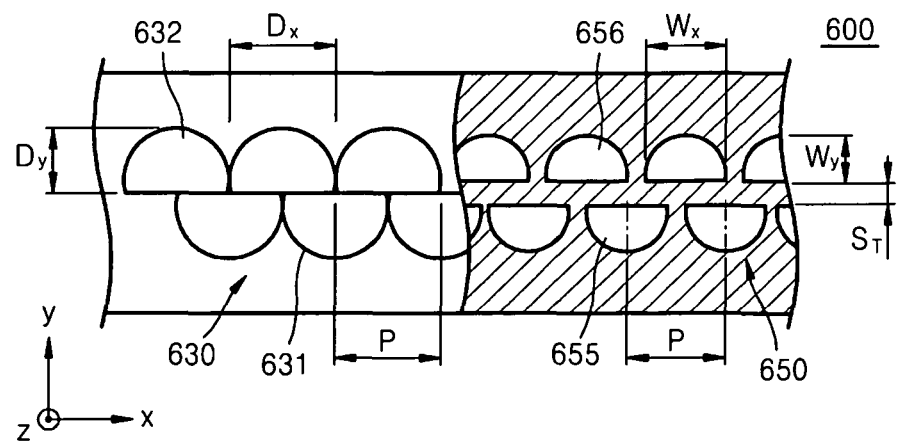
FIG. 14 is a cross-sectional view partially illustrating a lens array of Comparative Example 2 as viewed from above.
Figure 15:
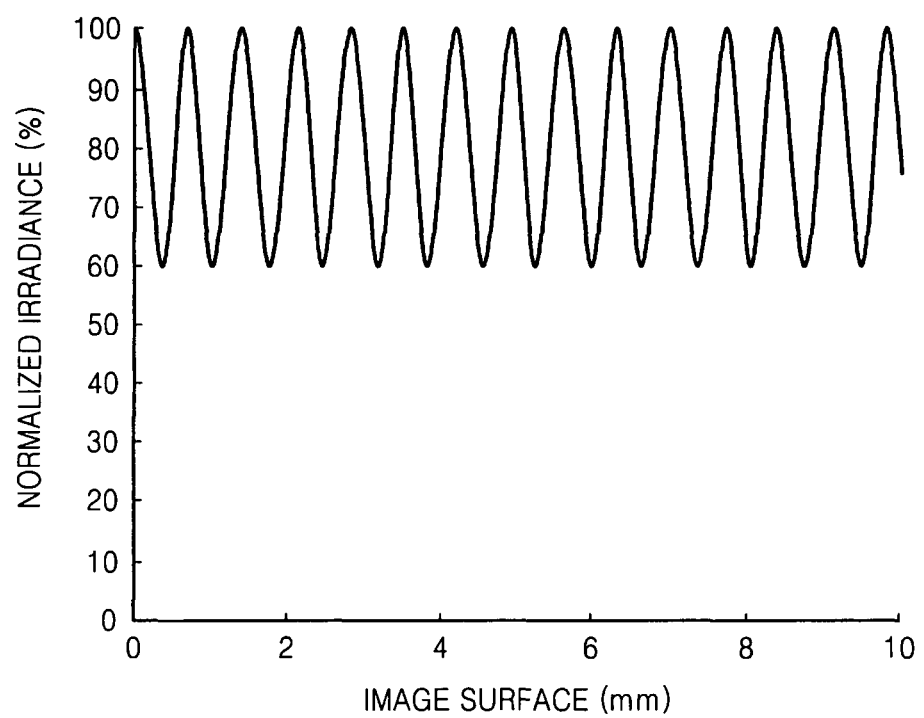
FIG. 15 is a graph showing fluctuations in normalized irradiance of light irradiated by a linear light exposure device including the lens array of FIG. 14 at an image surface.

FIG. 14 is a cross-sectional view partially illustrating a lens array 600 of Comparative Example 2 as viewed from above, wherein the lens array 600 of Comparative Example 2 is designed according to Table 2. Referring to FIG. 14, the lens array 600 according to Comparative Example 2 includes a light source side lens array (not illustrated), an image side lens array 630 including semicircular lens cells 631 and 632, and a light blocking unit 650 including semicircular light transmission regions 655 and 656. The light source side lens array (not illustrated) forms a pair with the image side lens array 630, which is symmetrical with respect to the image side lens array 630, and is provided at an incidence side of the light blocking unit 650. Similarly to Example 1, the lens cells 631 and 632 are arranged in two lines and have semicircular effective optical regions, Dx as a length of the lens cells 631 and 632 in an arrangement direction, and $D_Y$ as a width of the lens cells 631 and 632 in a direction perpendicular to the arrangement direction, wherein Dx is equal to a diameter of the circles and Dy is equal to a radius of the circles. Also, an arrangement period P of the lens cells 631 and 632 is the same as an aperture of the lens cells 631 and 632 (that is, $D_X$). The light transmission regions 655 and 656 of the light blocking unit 650 are arranged in two lines in correspondence to the two lines of the lens cells 631 and 632. A length $W_X$ of the light transmission regions 655 and 656 in an arrangement direction is equal to a diameter of the circles and a width $W_Y$ of the light transmission regions 655 and 656 in a direction perpendicular to the arrangement direction is equal to a radius of the circles. The lens array 600 according to Comparative Example 2 is different from the lens array 200 according to the previous embodiment of the present invention in that the lens cells 631 and 632 and the light transmission regions 655 and 656 have semicircular forms and each lens cell 631 and 632 has a semicircular effective optical region. A light source module (not illustrated) and a surface to be exposed (not illustrated) are arranged to be substantially the same as those of Example 2 of the current embodiment of the present invention. FIG. 15 is a graph showing a normalized irradiance curve of light irradiated by the linear light exposure device including the lens array 600 of Comparative Example 2 designed according to Table 2 instead of the lens array 500 in the linear light exposure device of FIG. 9.

Comparing FIG. 13 with FIG. 15, the fluctuation range of normalized irradiance of light at an image surface of Example 2 is very small compared with the fluctuation range of normalized irradiance of light at an image surface of Comparative Example 2. As the lens cells 511 and 531 in the first line and the lens cells 512 and 532 in the second line are alternately arranged, quantity of light emitted from the light emitting elements 110 and effectively used to form an image is fluctuated according to half of the arrangement period P of the lens cells 511, 512, 531, and 532 in the arrangement direction of the light emitting elements 110. Accordingly, in Example 2 as illustrated in FIG. 13, the quantity of light is fluctuated with a period of 0.5 mm and a light quantity deviation is no greater than 10%. On the other hand, in Comparative Example 2 as illustrated in FIG. 15, the quantity of light is fluctuated with a period of 0.7 mm and a light quantity deviation is 40%.

As described above, the fluctuation range of the normalized irradiance in Example 2 is smaller than the fluctuation range of Comparative Example 2 because the effective optical regions of the lens cells 511, 512, 531, and 532 are formed to have square forms in Example 2 and thus a deviation of magnitude of light quantity effectively used to form an image from light incident to the lens array 500 in the light source module 100 is suppressed.

Accordingly, as a deviation of magnitude of light quantity effectively used to form an image is suppressed, resolution and fluctuations of quantity of light, which result from a linear light exposure device including a general rod lens array or the lens array 600 of Comparative Example 2, may be significantly improved in the linear light exposure device according to the current embodiment.

Figure 16:
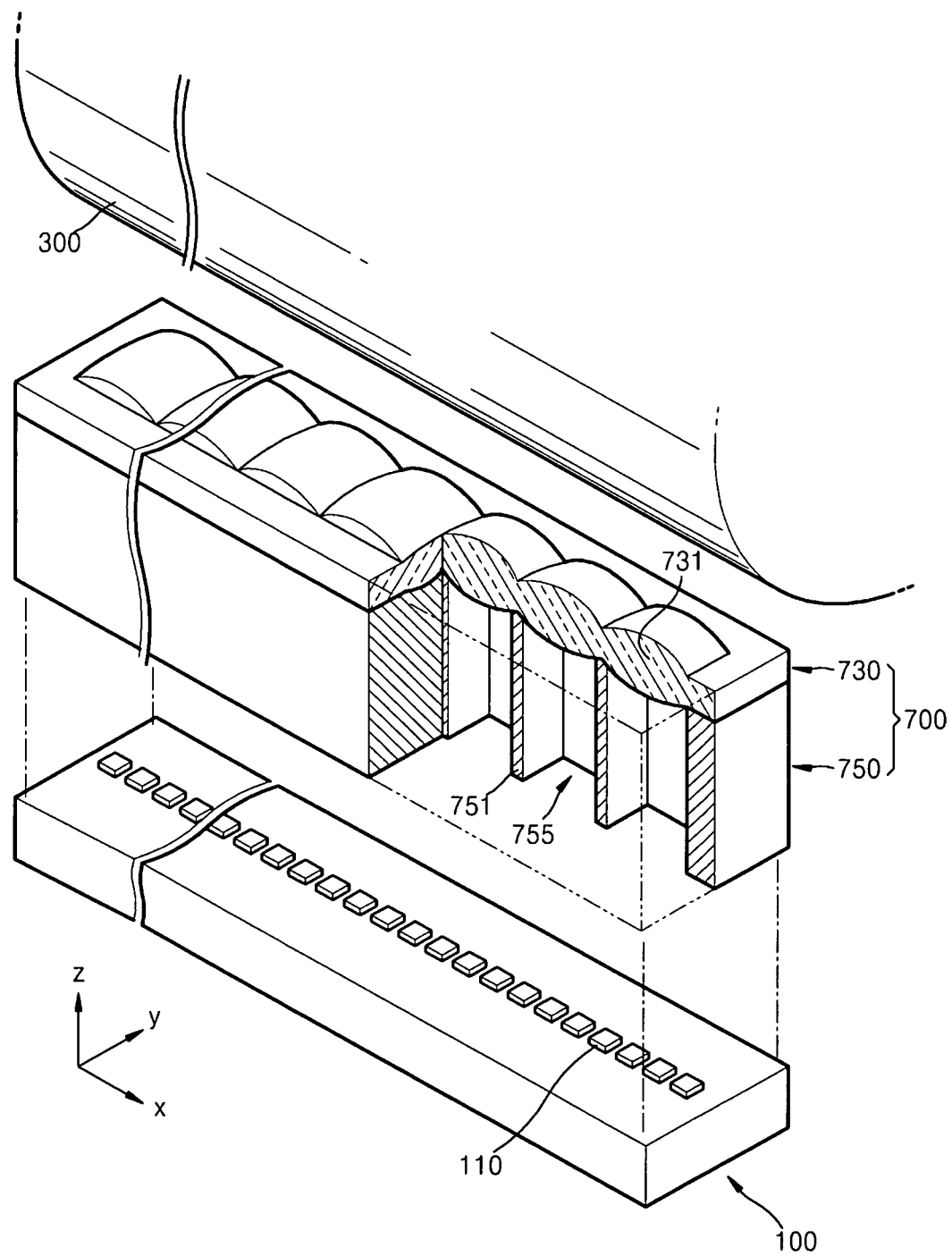
FIG. 16 is a partially cut perspective view of a lens array and a linear light exposure device according to another embodiment of the present invention.

FIG. 16 is a partially cut perspective view of a lens array 700 and a linear light exposure device according to another embodiment of the present invention.

The lens arrays 200 and 500 according to the previous embodiments include the pairs of light source side lens array unit 210 and 510 and image side lens array units 230 and 530, respectively; however, the present invention is not limited thereto. The lens array 700 of the linear light exposure device according to the current embodiment of the present invention includes one lens array unit 730 and light blocking units 750. In the current embodiment, only one lens array unit 730 is disposed between the light source module 100 and the surface to be exposed 300 so that a reduced, equal, or expanded inverted image may be formed on the surface to be exposed 300 according to an interval between the light source module 100 and the lens array unit 730, curvature of each of lens cells 731 of the lens array unit 730, and an interval between the lens array unit 730 and the surface to be exposed 300. In the current embodiment, effective optical regions of the lens cells 731 have square forms and the lens cells 731 are arranged in one line so that regions that are not used to form an image in the lens array unit 730 may be minimized, thereby reducing the periodic fluctuation ranges of quantity of light and increasing resolution.

The blocking units 750 may be partitioned by partition walls 751 to form light transmission regions 755 and the function of suppressing a ghost image of the light transmission regions 755 may be substantially the same as that of the blocking units 250 and 550. In the current embodiment, the lens cells 731 are arranged in one line; however, the present invention is not limited thereto. The lens cells 731 may be arranged in a plurality of lines.

Figure 17:
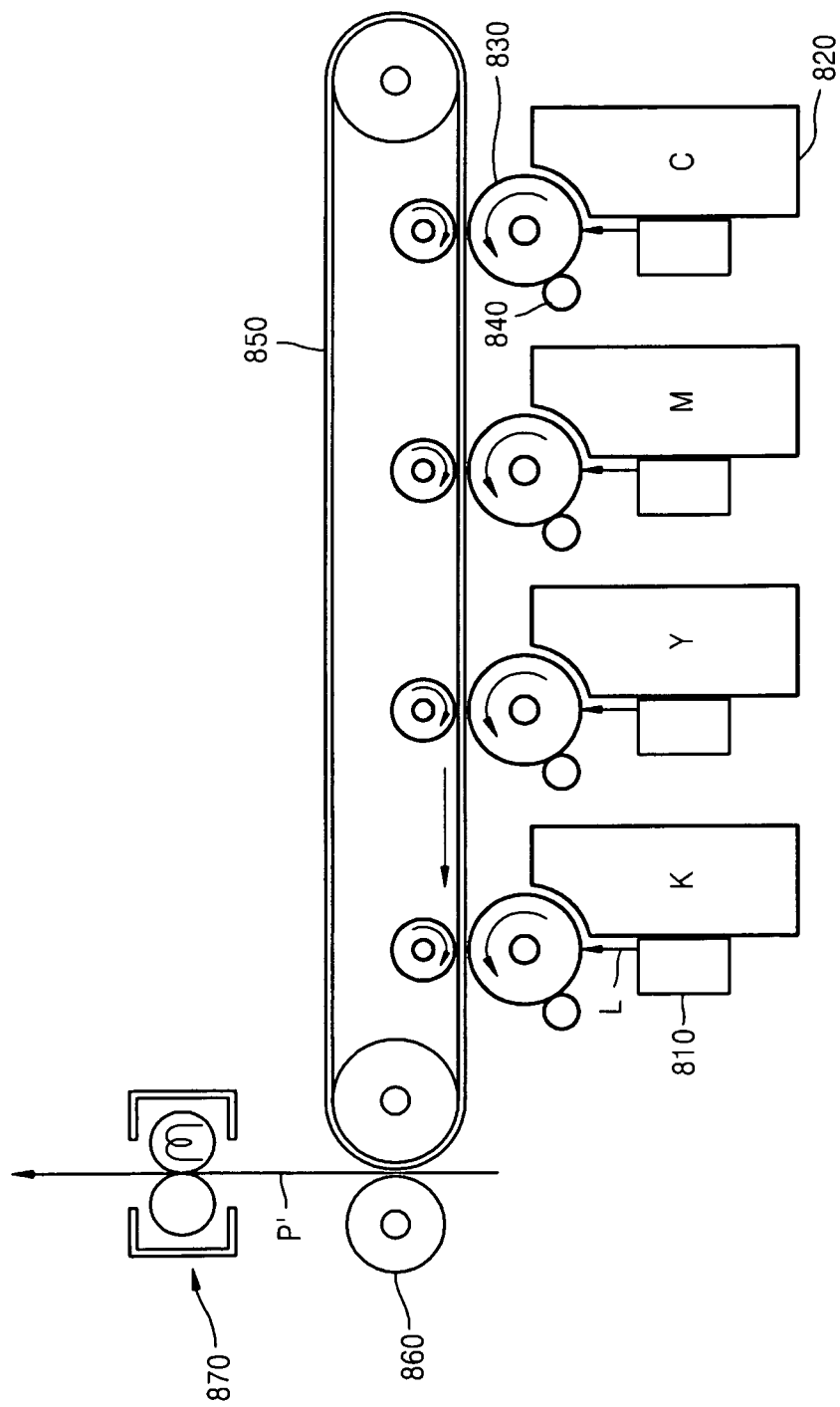
FIG. 17 schematically illustrates an image forming apparatus as an optical apparatus according to an embodiment of the present invention.
Figure 18:
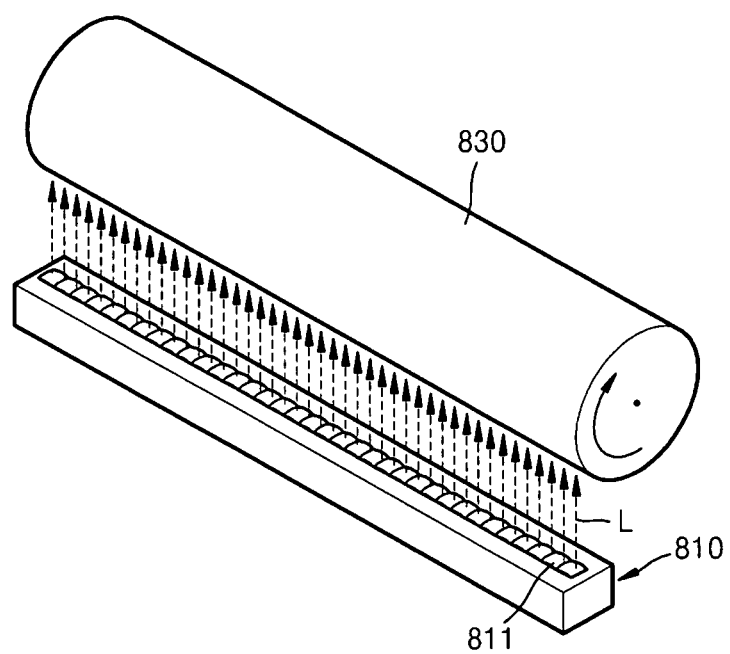
FIG. 18 schematically illustrates a linear light exposure device and a photosensitive medium in the image forming apparatus of FIG. 17.

FIG. 17 schematically illustrates an image forming apparatus as an optical apparatus according to an embodiment of the present invention and FIG. 18 schematically illustrates a linear light exposure device 810 and a photosensitive drum 830 in the image forming apparatus of FIG. 17.

Referring to FIG. 17, the image forming apparatus according to the current embodiment may include the linear light exposure device 810, a developing unit 820, the photoconductive drum 830, a charging roller 840, an intermediate transfer belt 850, a transfer roller 860, and a fixing unit 870.

In the current embodiment, the linear light exposure device 810, the developing unit 820, and the photoconductive drum 830 are provided for each color in order to print a color image. The linear light exposure device 810 exposes the photoconductive drum 830 to linear light L modulated according to image information and may be any of the linear light exposure devices described with reference to FIGS. 1 through 16. The linear light exposure device 810 exposes four photoconductive drums 830 to four lights L, respectively. The photoconductive drum 830 is one of photoconductive media and a circumference surface thereof is a surface to be exposed described in the previous embodiments. The photoconductive drum 830 is formed by forming a photosensitive layer having a predetermined thickness on an outer circumference of a cylindrical metal pipe. Electrostatic latent images corresponding to image information of black (K), magenta (M), yellow (Y), and cyan (C) are formed on four photoconductive drums 830, respectively. As a photoconductive medium, a belt type photoconductive belt may be used. One of the charging rollers 840 contacts the photoconductive drum 830 while rotating and charges the surface of the photoconductive drum 830 to a uniform electric potential. A charge bias Vc is applied to the charging roller 840. A corona charger (not illustrated) may be used instead of the charging roller 840. A toner is contained in the developing unit 820. The toner is moved to the photoconductive drum 830 by a developing bias applied between the developing unit 820 and the photoconductive drum 830 and develops an electrostatic latent image as a visible toner image. That is, four developing units 820 each apply black (K), magenta (M), yellow (Y), and cyan (C) toners to the photoconductive drums 830 and form black (K), magenta (M), yellow (Y), and cyan (C) toner images on the photoconductive drums 830, respectively. The black (K), magenta (M), yellow (Y), and cyan (C) toner images formed on the photoconductive drums 830 are electrostatically transferred to the intermediate transfer belt 850 and are overlapped onto each other, thereby forming a color toner image. The toner image is transferred to a paper P' transported between the transfer roller 860 and the intermediate transfer belt 850 by a transfer bias applied to the transfer roller 860. The intermediate transfer belt 850 and the transfer roller 860 are examples of a transfer unit and may be modified in various ways. For example, a drum type intermediate transfer roller may be used instead of the intermediate transfer belt 850. The toner image transferred to the paper P' is heated and pressurized by the fixing unit 870 and is fixed on the paper P', thereby completing formation of an image.

The above is only an example of image forming apparatuses that form a color image. Various known developing and transferring methods for forming a color image may be used. In addition, in an image forming apparatus for forming a single color image, only one linear light exposure device 810, developing unit 820, and photoconductive drum 830 may be provided.

Referring to FIG. 18, the linear light exposure device 810 is arranged having lens cells 811 in an arrangement direction. The arrangement direction is to be the same as a rotational direction of the photoconductive drum 830. Also, the linear light exposure device 810 is to be spaced apart from the photoconductive drum 830 by a few mm to a few tens of mm. As light emission of the light emitting elements 110 of FIG. 1 of the linear light exposure device 810 is controlled according to image information, linear light beams L irradiated from the linear light exposure device 810 are modulated to a linear image. The linear light beams L modulated according to the image information are irradiated to the outer circumference of the photoconductive drum 830. The outer circumference of the photoconductive drum 830 is exposed to the irradiated linear light beams L and a two-dimensional electrostatic latent image is formed on the outer circumference of the photoconductive drum 830 as the outer circumference of the photoconductive drum 830 rotates.

A light emitting element such as a light emitting diode emits light beams that are generally irradiated and thus an expensive optical device such as a rod lens array (RLA) is needed in a general linear light exposure device to form or collect light beams as parallel light. However, the linear light exposure device 810 according to the current embodiment of the present invention may replace the RLA with the lens array and each lens cell 811 of the lens array has a square formed effective optical region so that the periodic fluctuation range of light quantity may be reduced and resolution may be increased.

Figure 19:
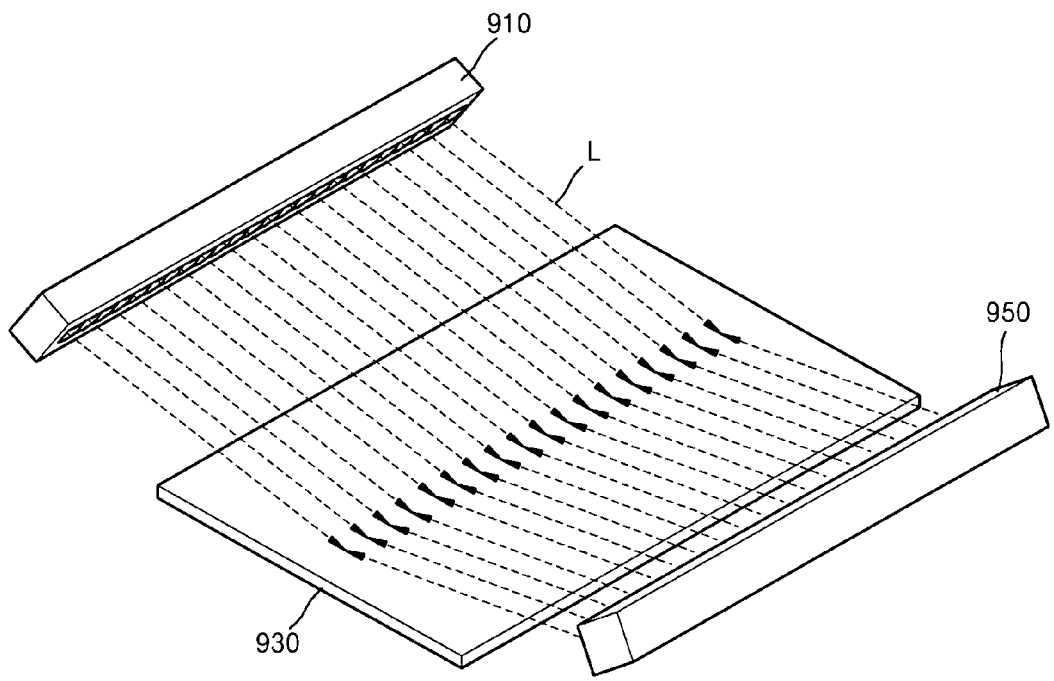
FIG. 19 schematically illustrates an optical reader as an optical apparatus according to another embodiment of the present invention.

FIG. 19 schematically illustrates an optical reader as an optical apparatus according to another embodiment of the present invention.

Referring to FIG. 19, the optical reader according to the current embodiment of the present invention includes a linear light exposure device 910 and an optical detection unit 950, wherein the linear light exposure device 910 irradiates linear light beams L onto an information medium 930 including information and the optical detection unit 950 receives the light beams L reflected from the information medium 930. The information medium 930 may be a barcode printed medium, a photograph, or a printed matter and may be a general medium having patterns in which reflectivity of light is partially different.

The linear light exposure device 910 may be any of the linear light exposure devices described with reference to FIGS. 1 through 16. The light beams L emitted from the linear light exposure device 910 may be linear and uniform. The light beams L reflected from the information medium 930 represent an image in which light quantity partially varies according to the information included in the information medium 930. The optical detection unit 950 may be, for example, a unit in which light receiving elements such as photodiodes are arranged in a line. The optical detection unit 950 reads information by extracting a linear image of the reflected light beam L.

The lens array, the linear light exposure device, the optical apparatus including the linear light exposure device according to the embodiments of the present invention suppress a size deviation of the effective optical regions of the lenses that correspond to light sources and thus reduce the periodic fluctuation range of light quantity generated from the image surface by the arrangement period of the lens, thereby increasing resolution and improving non-uniformity of light quantity.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens array comprising:
an image side lens array unit in which a plurality of lens cells are arranged in at least one line in an arrangement direction;
a columnar light blocking unit provided on an incidence surface of the image side lens array unit, the light blocking unit having light transmission regions, through which light is transmitted toward each lens cell of the image side lens array unit, and light blocking regions in regions other than the light transmission regions; and
a light source side lens array unit spaced apart from the image side lens array unit by the light blocking unit,
wherein the light blocking regions include partition walls, by which the light transmission regions are partitioned,
wherein the light source side lens array unit includes a plurality of lens cells arranged in at least one line in the arrangement direction,
wherein one of the plurality of lens cells of the image side lens array unit, one of the plurality of lens cells of the light source side lens array unit and one of the light transmission regions share a common one of the optical axes and each has a square effective optical region perpendicular to the common axis,
wherein cross sections perpendicular to the common optical axis of the one of the lens cells of the image side lens array unit, the one of the lens cells of the light source side lens array unit and the one of the light transmission regions are square, and
wherein the light transmission regions face directly light emitting surfaces of the lens cells of the light source side lens array unit and light incident surfaces of the lens cells of the image side lens array unit, respectively.

2. The lens array of claim 1, wherein, when $D_X$ is a length of the effective optical regions of the lens cells of the image side lens array unit and the light source side lens array unit in the arrangement direction and P is a distance between centers of the lens cells in a single line, the lens cells of the image side lens array unit and the light source side lens array unit satisfy $D_X \leq P$.

3. The lens array of claim 2, wherein the lens cells of the image side lens array unit and the light source side lens array unit further satisfy $P \leq 2D_X$.

4. The lens array of claim 1, wherein, when $D_X$ is a length of the effective optical regions of the lens cells of the image side lens array unit and the light source side lens array unit in the arrangement direction, $D_Y$ is a length of the effective optical regions of the lens cells in a direction perpendicular to the arrangement direction, $W_X$ is a length of the light transmission regions in the light blocking unit in the arrangement direction, and $W_Y$ is a length of the light transmission regions in a direction perpendicular to the arrangement direction, the light transmission regions satisfy $W_X \leq D_X$ and $W_Y \leq D_Y$.

5. The lens array of claim 1, wherein the light source side lens array unit and the image side lens array unit constitute a unit magnification (1×) image forming optical system.

6. The lens array of claim 1, wherein each lens cell of the light source side lens array unit has an emitting surface having a same curvature as an incidence surface of each lens cell of the image side lens array unit, and each lens cell of the light source side lens array unit has an incidence surface having a same curvature as an emitting surface of each lens cell of the image side lens array unit.

7. The lens array of claim 1, wherein at least one of incidence surfaces and emitting surfaces of each lens cell of the image side lens array unit and the light source side lens array unit is an aspheric surface.

8. The lens array of claim 1, wherein, when $D_X$ is a length of the effective optical regions of the lens cells of the image side lens array unit in the arrangement direction and P is a distance between centers of the lens cells in a single line, the lens cells of the image side lens array unit satisfy $D_X \leq P$.

9. The lens array of claim 8, wherein the lens cells of the image side lens array unit further satisfy $P \leq 2D_X$.

10. The lens array of claim 1, wherein, when $D_X$ is a length of the effective optical regions of the lens cells of the image side lens array unit in the arrangement direction, $D_Y$ is a length of the effective optical regions of the lens cells in a direction perpendicular to the arrangement direction, $W_X$ is a length of the light transmission regions in the light blocking unit in the arrangement direction, and $W_Y$ is a length of the light transmission regions in a direction perpendicular to the arrangement direction, the light transmission regions satisfy $W_X \leq D_X$ and $W_Y \leq D_Y$.

11. The lens array of claim 10, wherein the lens cells of the image side lens array unit further satisfy $D_X \leq P \leq 2D_X$.

12. The lens array of claim 1, wherein at least one of incidence surfaces and emitting surfaces of each lens cell of the image side lens array unit is an aspheric surface.

13. A linear light exposure device comprising:
a light source module in which light emitting elements are arranged in a at least one line;
a lens array for irradiating light emitted from the light source module to a surface to be exposed, the lens array including: an image side lens array unit in which a plurality of lens cells are arranged in at least one line in an arrangement direction and arranged having optical axes thereof parallel with each other; a columnar light blocking unit provided on an incidence surface of the image side lens array unit, the light blocking unit having light transmission regions, through which light is transmitted toward each lens cell of the image side lens array unit, and light blocking regions in regions other than the light transmission regions; and a light source side lens array unit spaced apart from the image side lens array unit by the light blocking unit,
wherein the light blocking regions include partition walls, by which the light transmission regions are partitioned,
wherein the light source side lens array unit includes a plurality of lens cells arranged in at least one line in the arrangement direction,
wherein one of the plurality of lens cells of the image side lens array unit, one of the plurality of lens cells of the light source side lens array unit and one of the light transmission regions share a common one of the optical axes and each has a square effective optical region perpendicular to the common axis,
wherein cross sections perpendicular to the common optical axis of the one of the lens cells of the image side lens array unit, the one of the lens cells of the light source side lens array units and the one of the light transmission regions are square, and
wherein the light transmission regions face directly light emitting surfaces of the lens cells of the light source side lens array unit and light incident surfaces of the lens cells of the image side lens array unit, respectively.

14. The device of claim 13, wherein, when $D_X$ is a length of the effective optical regions of the lens cells of the image side lens array unit and the light source side lens array unit in the arrangement direction and P is a distance between centers of the lens cells in a single line, the lens cells of the image side lens array unit and the light source side lens array unit satisfy $D_X \leq P \leq 2D_X$.

15. The device of claim 13, wherein, when $D_X$ is a length of the effective optical regions of the lens cells of the image side lens array unit and the light source side lens array unit in the arrangement direction, $D_Y$ is a length of the effective optical regions of the lens cells in a direction perpendicular to the arrangement direction, $W_X$ is a length of the light transmission regions in the light blocking unit in the arrangement direction, and $W_Y$ is a length of the light transmission regions in a direction perpendicular to the arrangement direction, the light transmission regions satisfy $W_X \leq D_X$ and $W_Y \leq D_Y$.

16. The device of claim 13, wherein the light source side lens array unit and the image side lens array unit constitute a unit magnification (1×) image forming optical system.

17. The device of claim 13, wherein, when $D_X$ is a length of the effective optical regions of the lens cells of the image side lens array unit in the arrangement direction and P is a distance between centers of the lens cells in a single line, the lens cells of the image side lens array unit satisfy $D_X \leq P \leq 2D_X$.

18. The device of claim 13, wherein, when $D_X$ is a length of the effective optical regions of the lens cells of the image side lens array unit in the arrangement direction, $D_Y$ is a length of the effective optical regions of the lens cells in a direction perpendicular to the arrangement direction, $W_X$ is a length of the light transmission regions in the light blocking unit in the arrangement direction, and $W_Y$ is a length of the light transmission regions in a direction perpendicular to the arrangement direction, the light transmission regions satisfy $W_X \leq D_X$ and $W_Y \leq D_Y$.

19. An optical apparatus for developing an image by using an electrostatic latent image and forming an image by transferring the developed image to a printing medium, the apparatus comprising:
a linear light exposure device;
a photoconductive medium on which an electrostatic latent image is formed by light irradiated from the linear light exposure device;
a developing unit for developing the electrostatic latent image formed on the photoconductive medium;
a transferring unit for transferring the image developed by the developing unit to a printing medium; and
a fixing unit for fixing the image transferred to the printing medium,
wherein the linear light exposure device includes: a light source module in which light emitting elements are arranged in at least one line; and a lens array for irradiating light emitted from the light source module to a surface to be exposed, the lens array including: an image side lens array unit in which a plurality of lens cells are arranged in at least one line in an arrangement direction and arranged having optical axes thereof parallel with each other; a columnar light blocking unit provided on an incidence surface of the image side lens array unit; and a light source side lens array unit spaced apart from the image side lens array unit by the light blocking unit, the light blocking unit having light transmission regions, through which light is transmitted toward each lens cell of the image side lens array unit, and light blocking regions in regions other than the light transmission regions,
wherein the light blocking regions include partition walls, by which the light transmission regions are partitioned,
wherein the light source side lens array unit includes a plurality of lens cells arranged in at least one line in the arrangement direction,
wherein one of the plurality of lens cells of the image side lens array unit, one of the plurality of lens cells of the light source side lens array unit, and one of the light transmission regions share a common one of the optical axes, and each has a square effective optical region,
wherein cross sections perpendicular to the common optical axis of the one of the lens cells of the image side lens array unit, one of the lens cells of the light source side lens array unit and the one of the light transmission regions are square, and
wherein the light transmission regions face directly light emitting surfaces of the lens cells of the light source side lens array unit and light incident surfaces of the lens cells of the image side lens array unit, respectively.

20. The apparatus of claim 19, wherein, when $D_X$ is a length of the effective optical regions of the lens cells of the image side lens array unit and the light source side lens array unit in the arrangement direction and P is a distance between centers of the lens cells in a single line, the lens cells of the image side lens array unit and the light source side lens array unit satisfy $D_X \leq P \leq 2D_X$.

21. The apparatus of claim 19, wherein, when $D_X$ is a length of the effective optical regions of the lens cells of the image side lens array unit and the light source side lens array unit in the arrangement direction, $D_Y$ is a length of the effective optical regions of the lens cells in a direction perpendicular to the arrangement direction, $W_X$ is a length of the light transmission regions in the light blocking unit in the arrangement direction, and $W_Y$ is a length of the light transmission regions in a direction perpendicular to the arrangement direction, the light transmission regions satisfy $W_X \leq D_X$ and $W_Y \leq D_Y$.

22. The apparatus of claim 19, wherein, when $D_X$ is a length of the effective optical regions of the lens cells of the image side lens array unit in the arrangement direction and P is a distance between centers of the lens cells in the same line, the lens cells of the image side lens array unit satisfy $D_X \leq P \leq 2D_X$.

23. The apparatus of claim 19, wherein, when $D_X$ is a length of the effective optical regions of the lens cells of the image side lens array unit in the arrangement direction, $D_Y$ is a length of the effective optical regions of the lens cells in a direction perpendicular to the arrangement direction, $W_X$ is a length of the light transmission regions in the light blocking unit in the arrangement direction, and $W_Y$ is a length of the light transmission regions in a direction perpendicular to the arrangement direction, the light transmission regions satisfy $W_X \leq D_X$ and $W_Y \leq 5D_Y$.

* * * * *

UNITED STATES PATENT AND TRADEMARK OFFICE
CERTIFICATE OF CORRECTION

PATENT NO.         : 8,786,656 B2                                   Page 1 of 1
APPLICATION NO.    : 13/067008
DATED              : July 22, 2014
INVENTOR(S)        : Wan-chin Kim It is certified that error appears in the above-identified patent and that said Letters Patent is hereby corrected as shown below:

In the Claims

Column 17, Line 6, In Claim 13, after "in" delete "a".

Column 19, Line 23, In Claim 23, delete "$WY \leq 5DY$." and insert -- $WY \leq DY$. --, therefor.

Signed and Sealed this
Twenty-third Day of December, 2014

Michelle K. Lee
*Deputy Director of the United States Patent and Trademark Office*